Jan. 3, 1933.　　　F. A. RUMATZ　　　1,893,181
PACKING FOR WATER GAUGE GLASSES
Filed April 17, 1931

INVENTOR.
Frank A. Rumatz
BY Byron D. Cohn
ATTORNEY.

Patented Jan. 3, 1933

1,893,181

UNITED STATES PATENT OFFICE

FRANK A. RUMATZ, OF TOPEKA, KANSAS

PACKING FOR WATER GAUGE GLASSES

Application filed April 17, 1931. Serial No. 530,807.

My invention relates to improvements in packings for water gauge glasses.

The object of my invention is to provide a means for packing water gauge glasses of a kind to eliminate wear on the upper portion of the glass when the boiler water column is blown down.

Another object of my invention is to provide a packing means for the purpose described comprising a metal nozzle having a tapered apron and a gasket formed to accommodate the tapered apron in a manner to prevent leakage at the upper end of the gauge glass.

A still further object of my invention is to provide a similar packing for the lower end of the gauge glass consisting of the tapered portion and a similar gasket but without the nozzle.

These and other objects will hereinafter be more fully explained.

Referring to the drawing in which like characters pertain to like parts in the different views.

Figure 2:
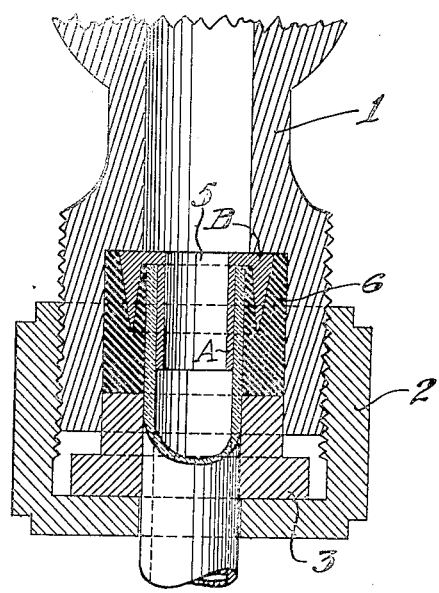
Fig. 2 is a perspective view of the packing nozzle used at the upper extremity of the gauge glass.
Figure 2:
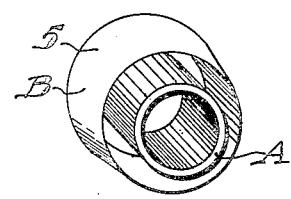
Figure 3:
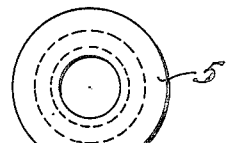
Fig. 3 is a plan view of the packing nozzle.
Figure 4:
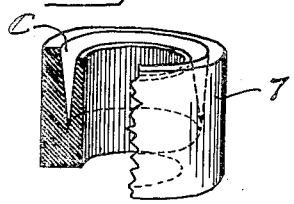
Fig. 4 is a perspective view of the packing, shown partly in section.

The upper water gauge valve 1 has a packing nut 2 and a gland 3, through which the upper end of the gauge glass 4 extends.

A packing nozzle 5 is positioned at the upper point of the gauge glass. This packing nozzle comprises a cylindrical nozzle portion A which protrudes into the interior of the glass 4 and which is integral with an annular apron B. This apron extends down over the outside of the glass 4 and is spaced therefrom. The inner and outer surfaces of the apron are tapered as shown.

A packing 6, preferably of rubber, is divided at C in a manner to accommodate the apron B.

When pressure is applied to the gland 3 by the rotation of the nut 2, the packing 6 is forced against the outer wall of the gauge glass and inner wall of the lower portion of the gauge valve by means of the wedge action of the tapered apron B. Thereby making a very effective seal at the upper point of the gauge glass.

The lower water gauge valve 1' has a packing nut 2' and a gland 3', through which the lower end of the gauge glass 4 extends.

Figure 1:
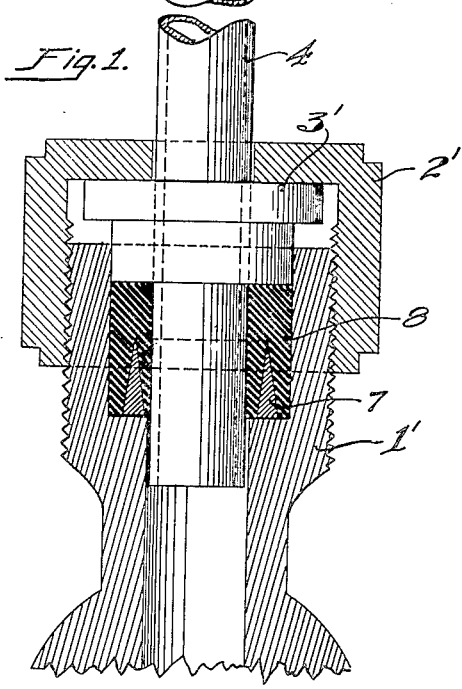
Fig. 1 is a longitudinal section of a gauge glass mounting.
Figure 5:
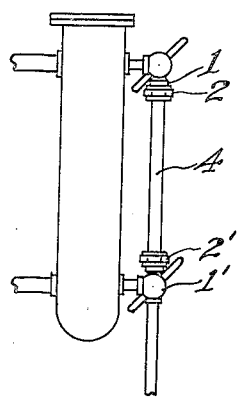
Fig. 5 is an elevation of a gauge glass in position on a boiler water column.

An annular apron 7 encircles the gauge glass as shown in section in Fig. 1. This apron is similar in shape to the apron B, however it is not connected to a nozzle. The apron's inner and outer surfaces are tapered and function to force the packing 8, which is similar to the packing 6 against the exterior of the gauge glass and interior of the chamber in the gauge valve 1' in the same manner as that described for the apron B and the packing 6. This forms a very effective seal at the bottom connection of the water gauge glass.

The combination nozzle and apron described prevents wear on the upper portion of the gauge glass when the water column is blown down and the action of the apron against the packing provides the proper seal.

The principle of my invention is embodied in the combination of the nozzle and apron member with the packing described and such modifications may be employed as lie within the scope of the appended claims and what I claim as new and desire to secure by Letters Patent is:

1. In a packing means for water gauge glasses, a packing nozzle and a packing, the packing nozzle comprising a cylindrical member protruding into the upper portion of a gauge glass, the said member integral with and co-axial with an apron, the said apron encircling the outer surface of the glass, a packing having a divided portion to receive the apron, and means to force the packing against the apron.

2. In a packing means for water gauge glasses, a packing nipple comprising a cylindrical nozzle and an apron, the said apron integral with the nozzle and having its inner and outer surfaces tapered, and a packing associated with the apron.

3. In a packing means for water gauge glasses, in combination with a gauge glass, an aproned nozzle and a packing, the nozzle comprising a hollow cylindrical portion integral with a tapered apron, the cylindrical portion extending into the gauge glass and the tapered apron encircling the gauge glass, the packing comprising a hollow cylindrical body having one edge divided to receive the apron.

In testimony whereof I affix my signature.

FRANK A. RUMATZ.